United States Patent
Kim et al.

(10) Patent No.: US 10,620,325 B2
(45) Date of Patent: Apr. 14, 2020

(54) DIFFERENT RADIATION MEASURING SENSOR AND MANUFACTURING METHOD THEREOF

(71) Applicant: KOREA ATOMIC ENERGY RESEARCH INSTITUTE, Daejeon (KR)

(72) Inventors: Han Soo Kim, Jeollabuk-do (KR); Jang Ho Ha, Jeollabuk-do (KR); Manhee Jeong, Incheon (KR); Young Soo Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 541 days.

(21) Appl. No.: 15/148,680

(22) Filed: May 6, 2016

(65) Prior Publication Data

US 2016/0327656 A1  Nov. 10, 2016

Related U.S. Application Data

(63) Continuation-in-part of application No. PCT/KR2014/003394, filed on Apr. 18, 2014.

(30) Foreign Application Priority Data

Dec. 20, 2013  (KR) ........................ 10-2013-0160009

(51) Int. Cl.
| | |
|---|---|
| *G01T 1/24* | (2006.01) |
| *G01T 1/16* | (2006.01) |
| *G01T 3/08* | (2006.01) |
| *G01T 1/20* | (2006.01) |
| *G01T 3/00* | (2006.01) |

(52) U.S. Cl.
CPC ............ *G01T 1/243* (2013.01); *G01T 1/1603* (2013.01); *G01T 1/24* (2013.01); *G01T 3/08* (2013.01); *G01T 1/2008* (2013.01); *G01T 3/00* (2013.01)

(58) Field of Classification Search
CPC ...... G01T 1/243; G01T 1/1603; G01T 1/2008
USPC .................................. 250/366, 370.06, 394
See application file for complete search history.

(56) References Cited

U.S. PATENT DOCUMENTS

| | | | |
|---|---|---|---|
| 7,189,975 B2 * | 3/2007 | Schmidt ................. | H01J 47/02 250/374 |
| 2005/0156114 A1 | 7/2005 | Yokoi et al. | |
| 2008/0290286 A1 | 11/2008 | Saito et al. | |

(Continued)

FOREIGN PATENT DOCUMENTS

| | | |
|---|---|---|
| JP | H065291 | 1/1994 |
| JP | 3197512 | 8/2001 |

(Continued)

*Primary Examiner* — David P Porta
*Assistant Examiner* — Carolyn Fin
(74) *Attorney, Agent, or Firm* — Lando & Anastasi, LLP

(57) ABSTRACT

Disclosed herein is a different radiation measuring sensor and a manufacturing method thereof. The different radiation measuring sensor includes a semiconductor substrate, at least one bottom electrode formed on a bottom surface of the semiconductor, a plurality of top electrodes formed on a top surface of the semiconductor and electrically connected to the bottom electrode, and sensing films formed on the plurality of top electrodes and reacting with different materials.

10 Claims, 6 Drawing Sheets

(56) References Cited

U.S. PATENT DOCUMENTS

| | | | |
|---|---|---|---|
| 2010/0102249 A1* | 4/2010 | Akselrod | G01T 1/10 250/459.1 |
| 2013/0193537 A1 | 8/2013 | Hossain et al. | |
| 2013/0228694 A1 | 9/2013 | Nakatsugawa et al. | |

FOREIGN PATENT DOCUMENTS

| | | |
|---|---|---|
| JP | 2003-279691 A | 10/2003 |
| JP | 2008-546999 A | 12/2008 |
| JP | 2010181412 | 8/2010 |
| JP | 2010-276519 | 12/2010 |
| JP | 4607587 B2 | 1/2011 |
| JP | 201372721 | 4/2013 |
| JP | 5791546 | 9/2013 |
| KR | 2009-0059350 A | 6/2009 |
| KR | 2010-0062438 A | 6/2010 |
| KR | 10-1065671 B1 | 9/2011 |

* cited by examiner

[FIG 2A]
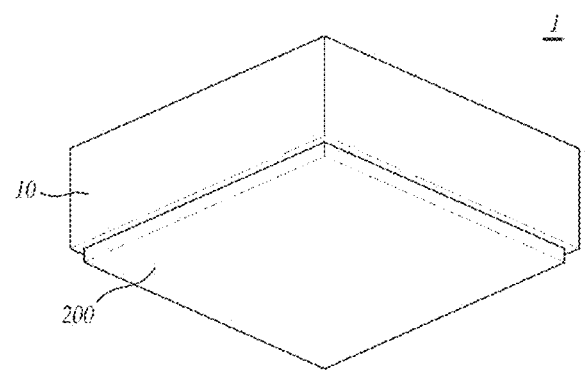
[FIG 2B]
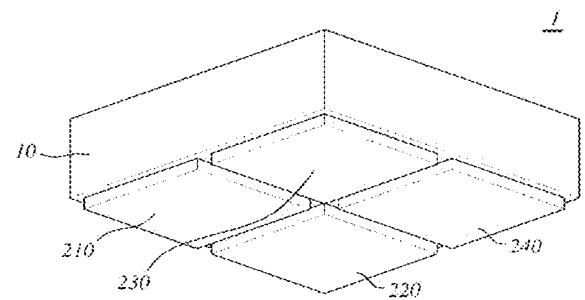

[FIG 3A]
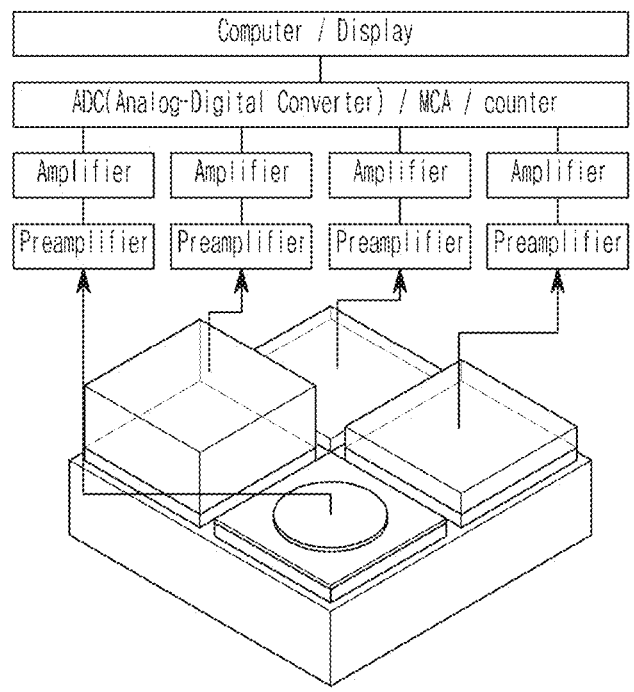
[FIG 3B]
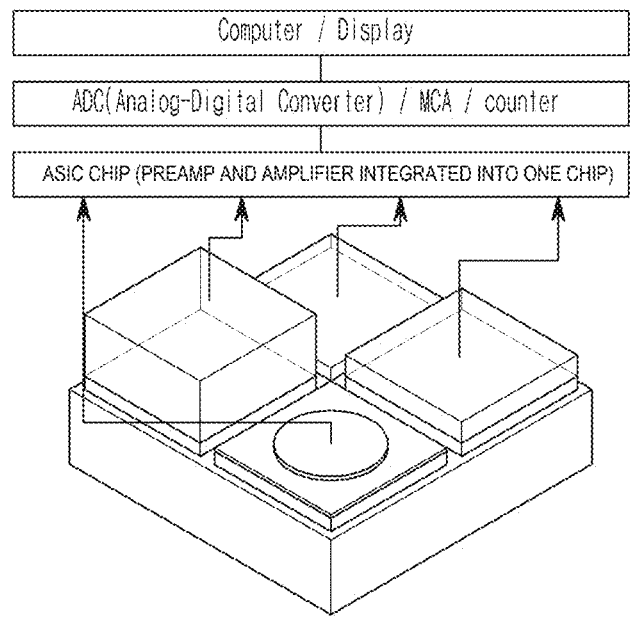

[FIG 4A]
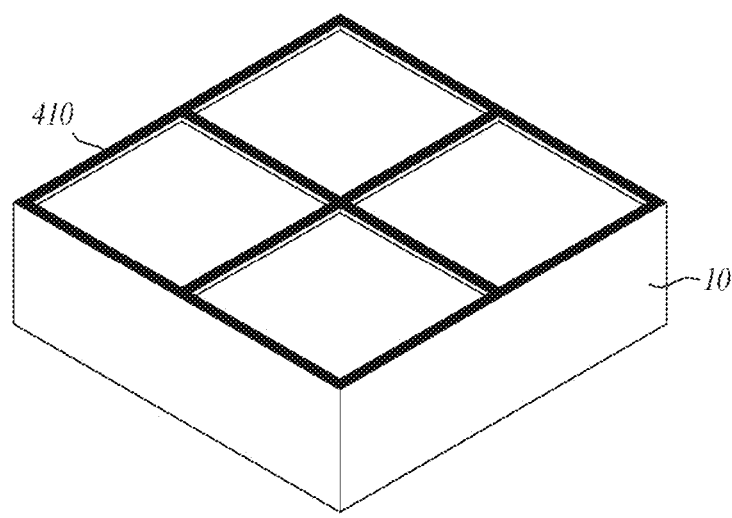
[FIG 4B]
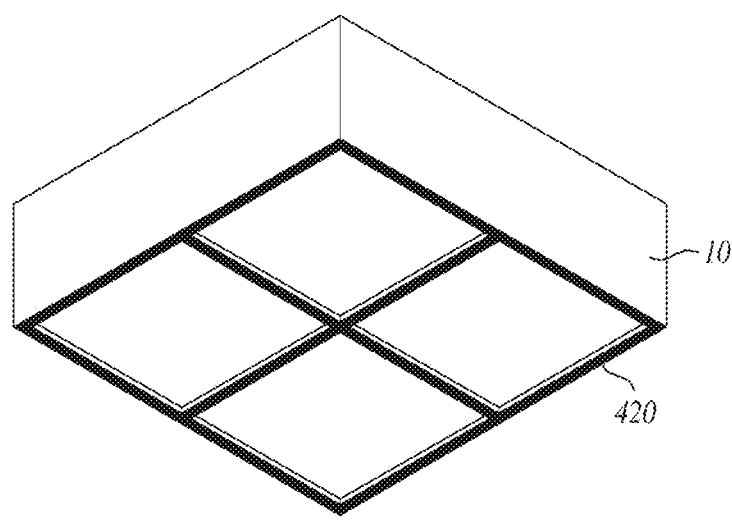

[FIG 5]
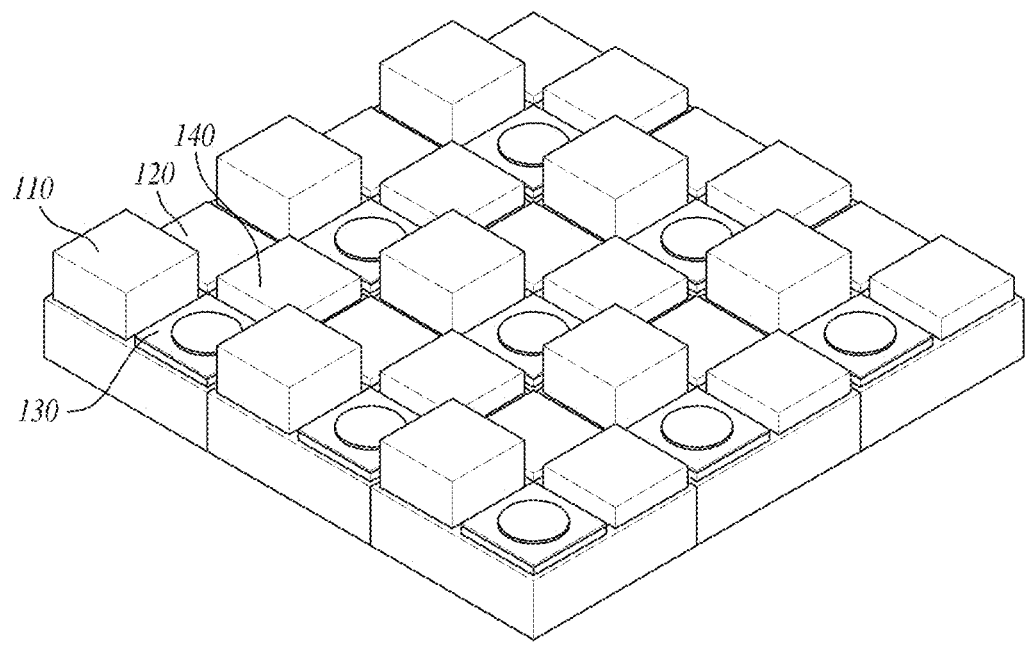

[FIG 6]
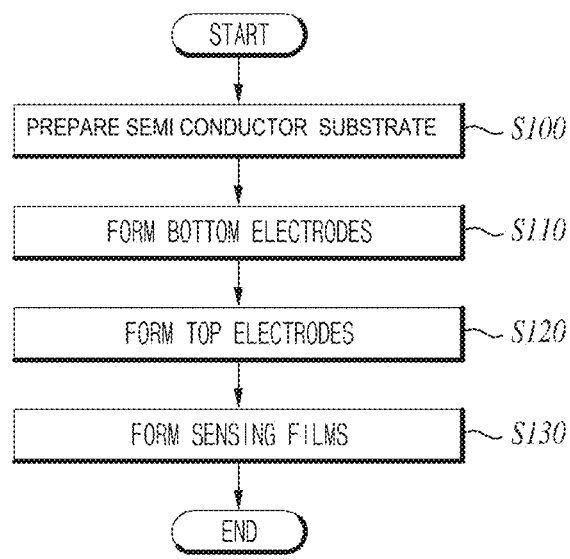

DIFFERENT RADIATION MEASURING SENSOR AND MANUFACTURING METHOD THEREOF

CROSS-REFERENCE TO RELATED APPLICATIONS

This application is a continuation-in-part (CIP) of International (PCT) Patent Application Serial No. PCT/KR2014/003394 filed on Apr. 18, 2014 which, in turn, claims the benefit of priority to Korean Patent Application Serial No. KR 10-2013-0160009 filed Dec. 20, 2013, the entire disclosure of each of which is hereby incorporated herein by reference in its entirety for all purposes.

TECHNICAL FIELD

The present disclosure relates to a radiation measuring sensor and a manufacturing method thereof, and in particular, to a radiation measuring sensor and a manufacturing method thereof capable of measuring different types of radiation with one sensor.

BACKGROUND ART

Nuclear energy is possibly used in real life by controlling so that a lot of energy instantaneously emitted at the time of nuclear explosion is released slowly as intended. By using this in nuclear power generation, thermal energy is used as power.

A nuclear reactor used for the nuclear power generation is an apparatus for using thermal energy generated in nuclear fission as power by controlling chain reactions such that lots of mass defect energy instantaneously generated from a chain nuclear fission reaction can be released. While a typical thermal furnace uses combustion heat of a material, the nuclear reactor uses the mass defect energy generated from the nuclear fission reaction. However, when the nuclear fission occurs in the nuclear reactor, not only lots of energy but also radiations are generated. The radiations include alpha rays, beta rays, X-rays, gamma rays, and neutrons, and various rays may compositely exist according to an environment.

In alpha radiation, two electrons are removed from a helium ion (He) and the remaining helium nucleus flows very rapidly. An alpha ray has a long wavelength and high reactivity with other materials, and accordingly allows ionization such that atoms or molecules in a material are broken, photosensitive phenomenon such that a chemical reaction occurs with photosensitive paper like a film, or fluorescence such that a light is emitted by reacting with a fluorescent material. However, an alpha ray has low penetrability so that it cannot penetrate even a sheet of paper. In addition, since they react well with other materials, alpha rays are frequently used in plant gene manipulation, and plant growth promotion and inhibition.

Beta radiation involves very rapid flow of electrons and has a longer wavelength than alpha radiation. Accordingly, ionization, photosensitive phenomenon, and fluorescence less frequently occur. The penetrability is a little higher so that paper or plastic is penetrable but a thin iron plate is not. Accordingly, beta radiation is used in measuring a thickness of plastic due to proper penetrability.

X-rays are a type of radiation that was accidentally found while Rontgen irradiated a metal with a cathode-ray, and have weaker but higher penetrability than gamma rays. X-rays are used very efficiently in the medical field, and also variously used in physics, biology, and chemistry, etc.

Gamma radiation corresponds to an electromagnetic wave, but not to a particle. Accordingly, a gamma ray has very low reaction with other materials but higher penetrability so that it can easily penetrate thin metal. Gamma rays cannot penetrate lead having a thickness of 30 cm or more or a concrete wall having a thickness of 1 m or more. In addition, gamma rays are mainly used in industry and the medical field. In particular, gamma rays are also used in nondestructive testing, metal thickness measurement, impurity concentration testing, or radiation treatment of a cancer patient, etc.

A neutron is an elementary particle. As a constituent element of a nucleus together with a proton, it has the almost the same mass as the proton and maintains neutrality without electricity. In addition, the neutron has such a large penetrability for a material that it is used in destructing the nucleus.

A typical single radiation sensor measures only single radiation, and, when different radiations are measured, different radiation sensors are necessary. In addition, a cost is high in forming a measuring instrument with different sensors mounted therein. A radiation sensor includes a gas type, a scintillation type, or a semiconductor type, and each type requires different electronic circuit configuration from each other.

DISCLOSURE

Technical Problem

Embodiments of the present invention are directed to provide a different radiation measuring sensor and a manufacturing method thereof that measure different radiations by using one sensor and an identical electronic circuit.

Technical Solution

According to an aspect of the present invention, there is provided a different radiation measuring sensor including: a semiconductor substrate; at least one bottom electrode formed on a bottom surface of the semiconductor; a plurality of top electrodes formed on a top surface of the semiconductor and electrically connected to the bottom electrode; and sensing films formed on the plurality of top electrodes and reacting with different materials.

Advantageous Effects

According to a different radiation measuring sensor and a manufacturing method of the present invention, different radiations can be measured by using one sensor and an identical electronic circuit.

In addition, the present invention has an effect of reducing a cost since it is not necessary to form a measuring instrument with different sensors mounted therein.

Also, the present has an effect of miniaturizing a measuring instrument by measuring different radiations with one sensor.

DESCRIPTION OF DRAWINGS

The above and other objects, features and other advantages of the present invention will be more clearly understood from the following detailed description taken in conjunction with the accompanying drawings, in which:

FIGS. 2A and 2B are perspective views for explaining a bottom surface of a different radiation measuring sensor according to an embodiment of the present invention;

FIGS. 3A and 3B are views for explaining connections between a different radiation measuring sensor and an electronic circuit according to an embodiment of the present invention;

FIGS. 4A and 4B are perspective views for explaining guard electrodes formed on a semiconductor substrate according to an embodiment of the present invention;

FIG. 5 is a perspective view for explaining an array of different radiation sensors according to an embodiment of the present invention; and FIG. 6 is a flow chart for explaining a manufacturing method of a different radiation measuring sensor according to an embodiment of the present invention.

MODE FOR INVENTION

Figure 1:
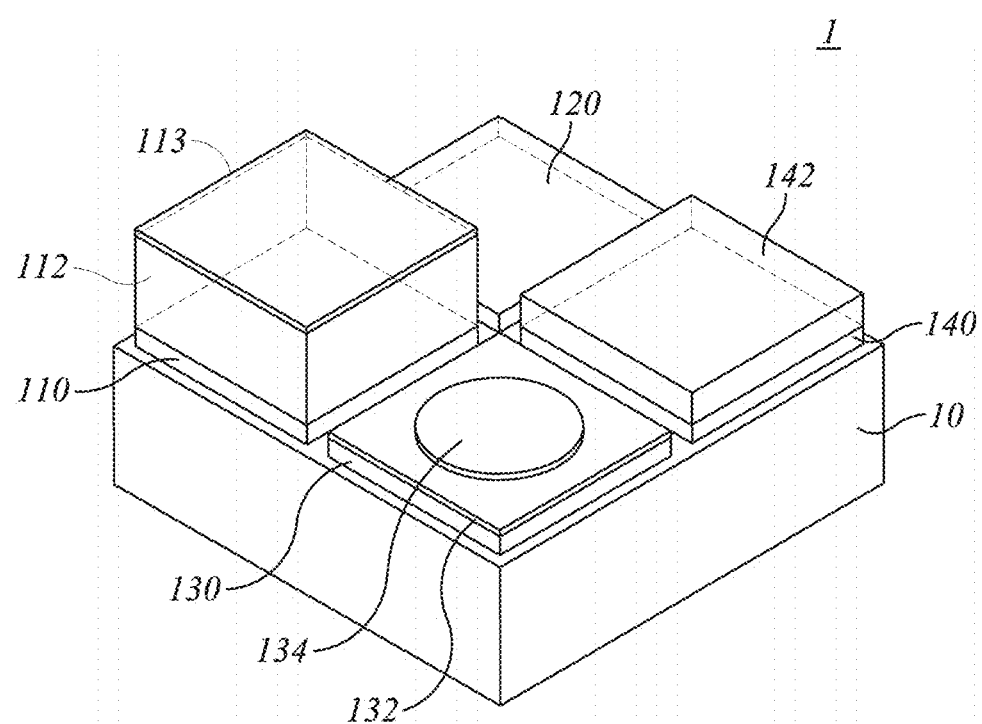
FIG. 1 is a perspective view for explaining a top surface of a different radiation measuring sensor according to an embodiment of the present invention.

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

FIG. 1 is a perspective view for explaining a top surface of a different radiation measuring sensor according to an embodiment of the present invention, and FIG. 2 is a perspective view for explaining a bottom surface of a different radiation measuring sensor according to an embodiment of the present invention.

Referring to FIGS. 1 and 2, a different radiation measuring sensor 1 may measure different radiations. The different radiation measuring sensor 1 may have at least two sensors, which measure different radiations, having different types formed therein. The different radiation measuring sensor 1 may measure at least one of an alpha ray, a beta ray, an X-ray, and a gamma ray.

The different radiation measuring sensor 1 may have a first sensing film that senses an X-ray or a gamma ray, a second sensing film that senses an alpha ray or a beta ray, a third sensing file that senses a neutron, and a reference film that does not sense any radiation. The first to third sensing films and the reference film may be formed on a top surface of a semiconductor substrate 10.

The semiconductor substrate 10 may include one of silicon (Si), silicon carbide (SiC), gallium arsenide (GaAs), cadmium telluride (CdTe), cadmium zinc telluride (CdZnTe), mercuric iodide ($HgI_2$), group N semiconductors, group II-IV semiconductors, and group III-IV semiconductors.

A plurality of top electrodes may be formed on the top surface of the semiconductor substrate 10. In an embodiment, the number of the top electrodes may be four. The top electrodes may include at least two top electrodes among a first top electrode 110, a second top electrode 120, a third top electrode 130, and a fourth electrode 140.

The first to fourth top electrodes 110, 120, 130, and 140 may be formed from at least one of gold (Au), aluminum (Al), platinum (Pt), nickel (Ni), and copper (Cu). In addition, the thickness of the first to fourth top electrodes 110, 120, 130, and 140 may be several hundred to several thousand Å.

FIG. 2A illustrates an embodiment in case where the number of bottom electrodes of the different radiation measuring sensor 1 is one, and FIG. 2B illustrates another embodiment in case where the number of bottom electrodes of the different radiation measuring sensor 1 is in plurality. One bottom electrode or a plurality of bottom electrodes may be formed on the bottom surface of the semiconductor substrate 10.

A single bottom electrode 200 may correspond to the first to fourth top electrodes 110, 120, 130, and 140. In particular, a forming process of the single bottom electrode 200 may be easier than that of the plurality of bottom electrodes and a cost thereof may be reduced due to reduced operations.

A plurality of bottom electrodes 210, 220, 230, and 240 may be formed to correspond to the plurality of top electrodes 110, 120, 130, and 140. That is, the plurality of bottom electrodes 210, 220, 230, and 240 may be formed of a first bottom electrode 210 corresponding to the first top electrode 110, a second bottom electrode 220 corresponding to the second top electrode 120, a third bottom electrode 230 corresponding to the third top electrode 130, and a fourth bottom electrode 240 corresponding to the fourth top electrode 140.

The plurality of bottom electrodes 210, 220, 230, and 240 may be easier than the single bottom electrode 200 in maintenance. The plurality of bottom electrodes 210, 220, 230, and 240 respectively have one-to-one correspondence with the top electronics 110, 120, 130, and 140. Even if a problem occurs in one of the bottom electrode 210, 220, 230, and 240, rest of them may operate.

The bottom electrodes may be formed from at least one of gold (Au), aluminum (Al), platinum (Pt), nickel (Ni), and copper (Cu). In addition, the thickness of the bottom electrodes may be several hundred to several thousand Å.

The bottom and top electrodes may be formed as a PIN type or a Schottky type according to a kind of semiconductor. The bottom and top electrodes may be a portion that may be bonded to a printed circuit board (PCB) or a ceramic substrate.

A scintillator 112 or a single crystal of a scintillator 112 may be formed on the top surface of the first top electrode 110. The scintillator 112 may be one of CsI(Tl), CWO, LaBr3, NaI(Tl), and CeBr. In addition, a thin reflective film 113 made from one of a reflective solution, Teflon, and an aluminum foil may be formed on the surface of the formed scintillator.

A neutron reactive material 132 may be formed on the top surface of the third to electrode 130. The neutron reactive material 132 may be one of 6Li, 10B, and Gd. A metal electrode 134 may be thinly formed on the neutron reactive material 132 so that the neutron reactive material 132 is to be capsulated.

A metal material having a high atomic number may be formed on the top surface of the fourth top electrode 140 to shield radiation. The metal material may sufficiently shield the radiation detectable from the semiconductor substrate 10. In particular, the radiation may be an X-ray or a gamma ray.

The metal material having the high atomic number may include a shield film made from any one metal thin film of $Pb^+$, $Cu^+$, Pb, and Cu.

A first sensing film may sense at least any one of an X-ray and a gamma ray. The first sensing film may include the scintillator 112 and the reflective film. The first sensing film may sense a scintillation amount generated when the X-ray or the gamma ray penetrates through the scintillator 112. The sensed scintillation amount may be converted into an electrical signal through an electronic circuit.

The reflective film may be formed around the scintillator 112 in order to maximally concentrate the generated scintillation amount on the first sensing film. Through this, the first sensing film may maximally absorb the scintillation amount.

The second sensing film may sense at least one of an alpha ray and a beta ray. The second sensing film may not be formed from any material. That is, the second sensing film may be the second top electrode. Although the alpha ray is formed of helium nucleus, has large mass, and is easily absorbed, the alpha ray does not move far away in the air and may be shielded with a cloth or a sheet of paper. Although the beta ray is formed of electrons and may move farther away than the alpha ray, the beta ray may be shielded even with the air having 1.3 meter thickness, water having 1.5 cm thickness, or a solid having several mm thickness. That is, there is a great energy difference between the alpha ray and the beta ray. The second sensing film may distinguish the alpha ray from the beta ray by using the above-described property. The second sensing film may measure penetration generated when any one of the alpha ray and the beta ray penetrates through the second top electrode 110. The measured penetration may be converted into an electrical signal through an electronic circuit.

The third sensing film may sense a neutron. The third sensing film may include the neutron reactive material 132 and the metal electrode 134. The third sensing film may measure an amount of chemical reaction generated while the neutron is projected onto the neutron reactive material 132. The amount of chemical reaction measured by a third sensing film may be converted into an electrical signal through an electronic circuit.

The reference film may not react with all kinds of radiations. The reference film may include a metal thin film 142. The reference film may play a role of a reference because it does not react with the radiation when the radiation is projected thereon. In addition, the reference film may check noise so as to increase sensitivity. That is, when a noise level of the reference film itself is known, noise levels of the first to third sensing films may be simultaneously known. Accordingly, the noise levels of the first to third sensing films reacting with radiations may be known on the basis of the reference film. In addition, signals of the first to third sensing films reacting with the radiations may be distinguished from that of the reference film and accordingly the sensitivity may be increased.

In particular, in the different radiation measuring sensor 1, n×n top electrodes may be formed on the top surface of the semiconductor substrate 10, and at least one sensing film reacting with different materials may be formed on the n×n top electrodes.

FIGS. 3A and 3B illustrate connections between different radiation measuring sensor and an electronic circuit according to an embodiment of the present invention.

Referring to FIGS. 3A and 3B, FIG. 3A illustrates connections between different radiation measuring sensor and an electronic circuit according to an embodiment, and FIG. 3B illustrates connections between different radiation measuring sensor and an electronic circuit according to an embodiment according to another embodiment.

Bottom electrodes of the different radiation measuring sensor 1 may be electrically connected to a identical electronic circuit. The electronic circuit may include a preamplifier, an amplifier, an analog-to-digital converter (ADC), a micro channel architecture, and a counter.

FIG. 3A illustrates that each sensing film of the different radiation measuring sensor 1 is electrically connected to each electronic component. The different radiation measuring sensor 1 may measure different radiations. The measured different radiations may be a minute signal. The preamplifier may amplify the measured signal and prevent noise from being mixed or a signal-to-noise ratio from being lowered. The amplifier may amplify again the pre-amplified signal. The ADC may convert the amplified analog signal into a digital signal and allow different radiation energy spectrums to be measured. In particular, the counter may measure data for amounts of different radiations. The computer may control based on data that is a converted digital signal, and display the controlled result. The display may be one of a monitor, a liquid crystal display, and a projector.

FIG. 3B illustrates that each sensing film of the different radiation measuring sensor 1 is electrically connected to one electronic component. The one electronic component may be an application specific integrated circuit (ASIC) that the preamplifier and the amplifier are integrated into one chip. Through this, the component shown in FIG. 3B may have simpler electronic circuit structure and a smaller volume than that shown in FIG. 3A.

FIGS. 4A and 4B are perspective views for explaining guard electrodes formed on a semiconductor substrate according to an embodiment of the present invention.

Referring FIGS. 4A and 4B, FIG. 4A is a perspective view illustrating a guard electrode 410 formed on the top surface of the semiconductor substrate 10, and FIG. 4B is a perspective view illustrating a guard electrode 420 formed on the bottom surface of the semiconductor substrate 10.

The guard electrodes 410 and 420 may be formed between patterns of the top and bottom electrodes on the semiconductor substrate 10. The guard electrodes are a kind of dummy electrode formed to block, in a certain degree, an electric field generated in omni-directions among the metals having potential differences, and allow the electric field to be generated in a desired form with respect to at least an electrode used as a sensor.

In the semiconductor substrate 10, a leakage current may be blocked by each top electrode on the top surface by using the guard electrode 410. In addition, in the semiconductor substrate 10, cross-talk between electrodes may be also prevented by applying a lower voltage than the sensor voltage to the guard electrode 410.

FIG. 5 is a perspective view for explaining an array of a different radiation measuring sensor according to an embodiment of the present invention.

Referring to FIG. 5, the different radiation measuring sensor 1 may be arrayed in a multiple manner.

The different radiation measuring sensor 1 may be arrayed in a grid form. The different radiation measuring sensor 1 may increase sensitivity for radiation measurement through the multiple array compared to a single array.

The multiply arrayed different radiation measuring sensor 1 may receive radiations in various directions. The radiations received by the multiply arrayed different radiation measuring sensor 1 may be converted into one image. Accordingly, the multiply arrayed different radiation measuring sensor 1 may measure a wider range of radiations than the single different radiation measuring sensor 1. In addition, the multiply arrayed different radiation measuring sensor 1 may have more accurate and higher sensitivity than the single different radiation measuring sensor 1. In particular, the multiple array of the different radiation measuring sensor 1 may be formed in an n×n array.

FIG. 6 is a flowchart for explaining a manufacturing method of a different radiation measuring sensor according to an embodiment of the present invention.

Referring to FIG. 6, the different radiation measuring sensor 1 may measure different radiations. The different radiation measuring sensor 1 may measure any one of an alpha ray, a beta ray, an X-ray, a gamma ray, and a neutron. The method of manufacturing the different radiation measuring sensor 1 may be largely divided into 4 steps.

In a first step, the semiconductor substrate 10 is prepared (S100). The semiconductor substrate 10 may be formed from any one of silicon (Si), silicon carbide (SiC), gallium arsenide (GaAs), cadmium telluride (CdTe), cadmium zinc telluride (CdZnTe), mercuric iodide ($HgI_2$), group N semiconductors, group II-IV semiconductors, and group III-IV semiconductors.

In a second step, bottom electrodes are formed (S110). In the second step, at least one bottom electrode may be formed on the bottom surface of the semiconductor substrate 10. The bottom electrode may be formed from at least one of gold (Au), aluminum (Al), platinum (Pt), nickel (Ni), and copper (Cu), and the thickness thereof may be several hundred to several thousand Å. In addition, the bottom electrode may include the first bottom electrode 210, the second bottom electrode 220, the third bottom electrode 230, and the fourth bottom electrode 240.

In a third step, top electrodes are formed (S120). In the third step, a plurality of top electrodes may be formed on the top surface of the semiconductor substrate 10. The top electrodes may be electrically connected to the bottom electrodes. The top electrodes may be formed from at least one of gold (Au), aluminum (Al), platinum (Pt), nickel (Ni), and copper (Cu), and the thickness thereof may be several hundred to several thousand Å. In addition, the top electrode may include the first top electrode 110, the second top electrode 120, the third top electrode 130, and the fourth top electrode 240.

The second and third steps may be exchanged to each other according to a manufacturing process. That is, the top electrode may be formed in the second step and the bottom electrodes may be formed in the third step.

In a fourth step, sensing films are formed (S130). In the fourth step, a first sensing film that senses an X-ray or a gamma ray, a second sensing film that senses an alpha ray or a beta ray, a third sensing film that senses a neutron, and a reference film which does not sense radiations may be formed on each of the top electrodes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

1: different radiation measuring sensor
10: semiconductor substrate
110: first top electrode
112: Scintillator
113: reflective film
120: second top electrode
130: third top electrode
132: neutron reactive material
134: metal electrode
140: fourth top electrode
142: metal thin film
210: first bottom electrode
220: second bottom electrode
230: third bottom electrode
240: fourth bottom electrode
410: first guard electrode
20: Second guard electrode

The invention claimed is:

1. A different radiation measuring sensor, comprising:
a semiconductor substrate;
four bottom electrodes formed on a bottom surface of the semiconductor substrate;
four top electrodes formed on a top surface of the semiconductor substrate, each top electrode corresponding to one of the four bottom electrodes and electrically connected to the respective corresponding bottom electrode; and
sensing films formed on the top electrodes, the sensing films including a first sensing film that is sensitive to a first type of radiation and a second sensing film that is sensitive to a second type of radiation, the second type of radiation being different from the first type of radiation.

2. The different radiation measuring sensor of claim 1, wherein the sensing films comprise:
the first sensing film sensitive to one or more X-rays and gamma rays;
the second sensing film sensitive to one or more of alpha rays and beta rays; and
a third sensing film sensitive to neutrons.

3. The different radiation measuring sensor of claim 2, wherein the first sensing film comprises a scintillator on a top surface of a first one of the top electrodes, and a reflective film on the scintillator.

4. The different radiation measuring sensor of claim 2, wherein the second sensing film comprises a neutron reaction material on the top surface of a second one of the top electrodes and a metal electrode on the neutron reaction material and encapsulating the neutron reaction material.

5. The different radiation measuring sensor of claim 1, further comprising a reference film shielding radiations detectable in the semiconductor substrate, the reference film comprising a metal thin film.

6. The different radiation measuring sensor of claim 5, wherein the reference film comprises any one metal thin film of Pb+, Cu+, Pb, and Cu.

7. The different radiation measuring sensor of claim 1, wherein each bottom electrode is electrically connected to an electronic circuit comprising at least one electronic component of a preamplifier, an amplifier, an application specific integrated circuit, an analog-to-digital converter, a micro channel architecture, and a counter.

8. The different radiation measuring sensor of claim 1, wherein the bottom and top electrodes are formed in any one type of a pin type and a Schottky type.

9. The different radiation measuring sensor of claim 1, wherein the top and bottom surfaces of the semiconductor substrate further comprise guard electrodes blocking leak currents among each of the electrodes.

10. The different radiation measuring sensor of claim 1, wherein the top electrodes are formed in an n×n array on the top surface of the semiconductor substrate and at least one of the sensing films is formed on the n×n top electrodes.

* * * * *